Aug. 7, 1951   G. H. RENDEL   2,563,274
METHOD AND APPARATUS FOR TESTING PINHOLE DETECTORS
Filed March 2, 1950
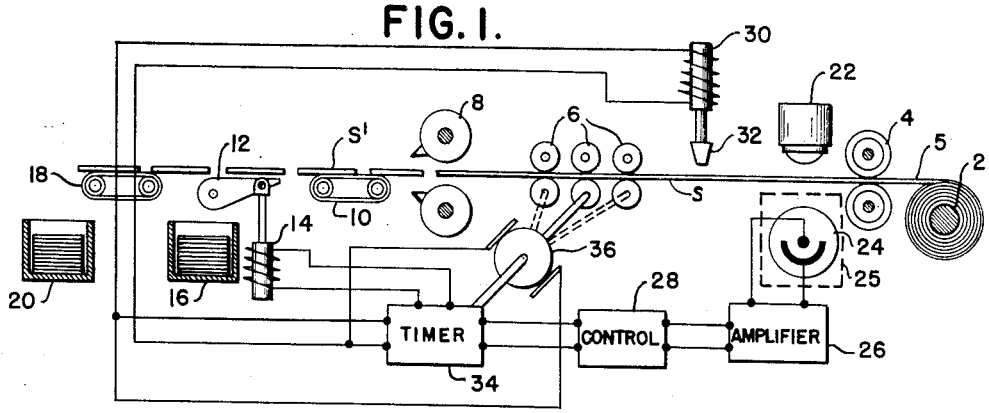
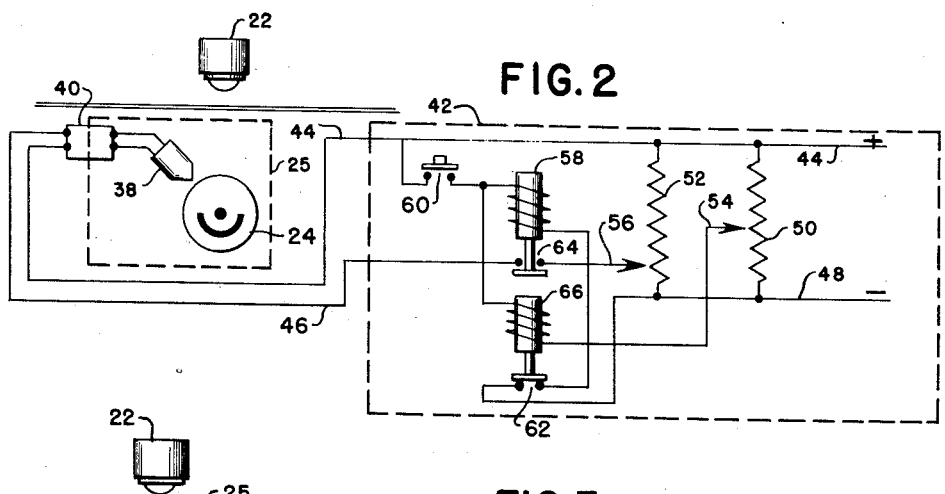
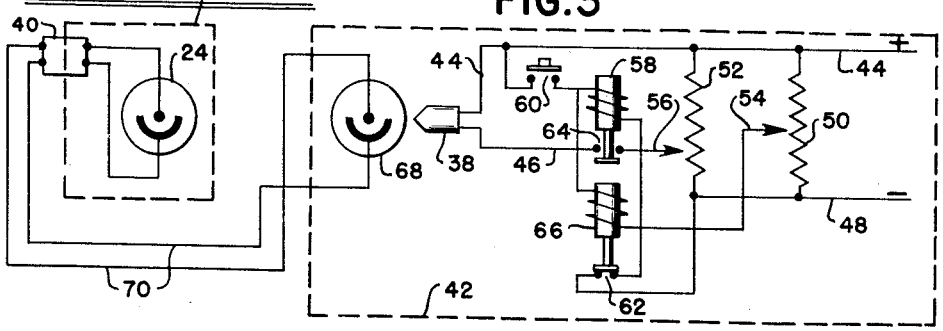
INVENTOR
GEORGE H. RENDEL
BY Donald G. Dalton
ATTORNEY Patented Aug. 7, 1951

2,563,274

UNITED STATES PATENT OFFICE 2,563,274

METHOD AND APPARATUS FOR TESTING PINHOLE DETECTORS

George H. Rendel, Pittsburgh, Pa., assignor to United States Steel Company, a corporation of New Jersey Application March 2, 1950, Serial No. 147,223

15 Claims. (Cl. 250—217)

This invention relates to a method and apparatus for testing a pin hole detector. In the manufacture of thin sheet products such as sheet steel which is used in the manufacture of tin cans, a defect known as "pin hole" occurs. These sheets are inspected for pin holes by conventional apparatus such as shown in the patent to Chamberlin et al. No. 2,229,638. When the sheets or strip from which they are made are traveling at high speeds it is impossible for an inspector to see many of the pin holes. Therefore, if the pin hole detector equipment fails to function properly, a large number of sheets may be processed before the fault becomes evident to an inspector.

It is therefore an object of my invention to provide apparatus for testing pin hole detectors while the detector is in operation.

Another object is to provide a method of testing a pin hole detector when the apparatus is in operation.

These and other objects will be more apparent after referring to the following specification and attached drawings, in which:

Figure 1 is a schematic view of a pin hole detector;

Figure 2 is an electric wiring diagram showing one embodiment of my invention; and Figure 3 is an electric wiring diagram showing a second embodiment of my invention.

Referring more particularly to the drawings the reference numeral 2 indicates an uncoiler for a strip S. The strip S passes from the uncoiler 2 through side trimming knives 4 and measuring rolls 6 to the shearing drums 8, where the strip is sheared into sheets S' of the desired length. The sheared sheets pass over the conveyor 10 to a deflector 12 which is operated by means of a solenoid 14 to deflect imperfect sheets to a salvage piler 16. The perfect sheets pass over the deflector 12 to a conveyor 18, which delivers the sheets to a prime sheet piler 20. A high intensity light source 22 is located above the strip adjacent the side trimming knives 4 and a bank of light sensitive photoelectric cells 24 is located in a shielded housing 25 under the light sources 22 below the strip. When a section of strip containing a hole passes between the light source 22 and photoelectric cells 24, light passes through the hole and strikes one or more of the photo cells. This generates a small voltage impulse which is transmitted to a voltage amplifier 26 where the impulse is amplified to a value of sufficient magnitude to operate the controls of the control unit 28. The pin hole detector may be of the type shown in the patent to Chamberlin et al. No. 2,229,638. The control unit 28 converts the short impulse from the amplifier 26 into an impulse of sufficient power and duration to operate a solenoid 30 of a strip marker 32 which places a visible mark next to the hole, thus identifying the section of strip containing the hole. The control unit also provides an impulse to energize a solenoid in a proportional timer 34 which is driven by a motor 36 which also drives the measuring rolls 6. Thus the timer 34 is in synchronism with the movement of the strip. The proportional timer 34 is preferably of the type shown in the patent to Ladrach No. 2,217,-342 and is equipped with a contact mechanism which energizes the solenoid 14 to tilt the deflector 12 upwardly and direct the sheet containing the pin hole downwardly into the salvage piler 16.

In order to test the pin hole detector I provide an exciter lamp 38 which may be mounted in the housing 25 as shown in Figure 2. Preferably the lamp 38 is a glow-modulated tube. A receptacle 40 is mounted on the housing 25 with wires leading to the lamp 38. Preferably the testing device is mounted in a box 42 with leads 44 and 46 leading to the receptacle 40. Power for the lamp 38 is provided from a D. C. power source adapted to be connected to two wires 44 and 48. Adjustable potentiometers 50 and 52 are connected across the wires 44 and 48. The potentiometers 50 and 52 are provided with adjustable contact arms 54 and 56, respectively. A relay coil 58 is connected across wires 44 and 48 in series with a switch 60 and normally closed contacts 62. The switch 60 may be a push-button switch or an automatic interrupter which may be preset to provide a momentary connection for any period, thus permitting the inspector to check the detector more rapidly. The relay coil 58 is provided with normally open contacts 64 which are connected in series with the contact arm 56. The normally closed contacts 62 are operated by a timing relay coil 66 which is in series with the switch 60 and is connected to the contact arm 54. In place of relays 58 and 66 and their associated contacts electronic tubes may be substituted to complete the circuits to the contact arms 54 and 56. The position of the slide wire 54 determines the duration of the light impulse on lamp 38 and the contact arm 54 is preferably connected to a dial calibrated to show strip speed. Contact arm 56 is adjustable to vary the intensity of the light on lamp 38 and is preferably connected to a dial calibrated to show the size of hole.

The operation of my device is as follows:

The wires 44 and 46 are plugged into the receptacle 40 and the wires 44 and 48 connected to a D. C. power source. The contact arms 54 and 56 are moved to the desired testing position and the switch 60 closed. Closing of switch 60 completes a circuit through relay coil 58 and normally closed contact 62. Energization of coil 58 closes contact 64 thus completing a circuit to lamp 38. Closing of switch 60 also completes a circuit to energize timing relay coil 66. Although potential is applied to relay coils 58 and 66 simultaneously, the operation of relay 66 is delayed due to lower impressed voltage thereon. When relay 66 finally operates it opens contacts 62, thus deenergizing relay 58 and breaking the circuit to lamp 38. By changing the position of contact arm 54 the duration of the impulse can be varied to determine the maximum speed at which the pin hole detector will work and by varying the position of contact arm 56 the minimum size hole that can be detected by the pin hole detector can be determined. When the lamp 38 is energized, the light will be delivered to the photoelectric cell 24, thus causing the control to operate in the same manner as though a pin hole had been passed over the detector.

The electronic circuits in the housing 25 are very sensitive to electrical disturbances and the electric arc discharge within the glow modulator tube 38 may cause false operations of the detector. In order to avoid this the exciter lamp 38 may be installed in the housing 42 as shown in Figure 3 and an additional photocell 68, similar to photocell 24, is mounted adjacent thereto. The photocells 24 and 68 will be connected in parallel by plugging wires 70 into the receptacle 40. In this manner a light impulse striking the electrodes of photocell 68 produces the same effect as though the light were exposed to photocell 24. The wires 70, connecting the photocell 68 to the receptacle 40, are preferably shielded to prevent extraneous disturbances.

While two embodiments of my invention have been shown and described it will be apparent that other adaptations and modifications may be made without departing from the scope of the following claims.

I claim:

1. Apparatus for testing a pin hole detector having a photoelectric cell for receiving an impulse when a pin hole occurs in a sheet being inspected, which apparatus comprises a lamp for directing light on said photoelectric cell, a pair of wires adapted to be connected to a direct current power source, two adjustable potentiometers connected across said wires, an adjustable contact arm for each of said potentiometers, a switch connected across said wires, and means in series with said switch to complete a circuit to said contact arms.

2. Apparatus for testing a pin hole detector having a photoelectric cell for receiving an impulse when a pin hole occurs in a sheet being inspected, which apparatus comprises a lamp for directing light on said photoelectric cell, a pair of wires adapted to be connected to a direct current power source, an adjustable potentiometer connected across said wires, an adjustable contact arm for said potentiometer, a relay coil connected across said wires, normally open contacts operable by said relay coil, a switch in series with said relay coil, normally closed contacts in series with said relay coil, said normally open contacts being in series with said contact arm, and a timing relay coil in series with said switch for operating said normally closed contacts.

3. Apparatus for testing a pin hole detector having a photoelectric cell for receiving an impulse when a pin hole occurs in a sheet being inspected, which apparatus comprises a lamp for directing light on said photoelectric cell, a pair of wires adapted to be connected to a direct current power source, two adjustable potentiometers connected across said wires, an adjustable contact arm for each of said potentiometers, a relay coil connected across said wires, normally open contacts operable by said relay coil, a switch in series with said relay coil, normally closed contacts in series with said relay coil, and a timing relay coil in series with said switch for operating said normally closed contacts, said timing relay coil being connected to one of said contact arms, said normally open contacts being in series with the other of said contact arms.

4. Apparatus for testing a pin hole detector having a photoelectric cell for receiving an impulse when a pin hole occurs in a sheet being inspected, which apparatus comprises a photoelectric cell adapted to be connected in parallel with the photoelectric cell of said detector, a lamp for directing light on said last named photoelectric cell, means for varying the intensity of the light impulse from said lamp, and means for varying the duration of the light impulse from said lamp.

5. Apparatus for testing a pin hole detector having a photoelectric cell for receiving an impulse when a pin hole occurs in a sheet being inspected, which apparatus comprises a photoelectric cell adapted to be connected in parallel with the photoelectric cell of said detector, a lamp for directing light on said last named photoelectric cell, a pair of wires adapted to be connected to a direct current power source, two adjustable potentiometers connected across said wires, an adjustable contact arm for each of said potentiometers, a relay coil connected across said wires, normally open contacts operable by said relay coil, a switch in series with said relay coil, normally closed contacts in series with say relay coil, and a timing relay coil in series with said switch for operating said normally closed contacts, said timing relay coil being connected to one of said contact arms, said normally open contacts being in series with the other of said contact arms.

6. The method of testing a pin hole detector having a photoelectric cell for receiving an impulse when a pin hole occurs in a sheet being inspected, which method comprises directing a light of known intensity and duration on said photoelectric cell, and varying the intensity of said light according to the size of hole it is desired to detect.

7. The method of testing a pin hole detector having a photoelectric cell for receiving an impulse when a pin hole occurs in a sheet being inspected, which method comprises directing a light of known intensity and duration on said photoelectric cell, and varying the duration of said light according to the desired speed of the sheet past the photoelectric cell.

8. The method of testing a pin hole detector having a photoelectric cell for receiving an impulse when a pin hole occurs in a sheet being inspected, which method comprises directing a light of known intensity and duration on said photoelectric cell, varying the intensity of said light according to the size of hole it is desired to detect, and varying the duration of said light according to the desired speed of the sheet past the photoelectric cell.

9. Apparatus for directing a light impulse of given intensity and duration on a photoelectric cell comprising a lamp for directing light on said photoelectric cell, a pair of wires adapted to be connected to a direct current power source, two adjustable potentiometers connected across said wires, an adjustable contact arm for each of said potentiometers, a switch connected across said wires, and means in series with said switch to complete a circuit to said contact arms.

10. Apparatus for directing a light impulse of given intensity and duration on a photoelectric cell comprising a lamp for directing light on said photoelectric cell, a pair of wires adapted to be connected to a direct current power source, two adjustable potentiometers connected across said wires, an adjustable contact arm for each of said potentiometers, a relay coil connected across said wires, normally open contacts operable by said relay coil, a switch in series with said relay coil, normally closed contacts in series with said relay coil, and a timing relay coil in series with said switch for operating said normally closed contacts, said timing relay coil being connected to one of said contact arms, said normally open contacts being in series with the other of said contact arms.

11. Apparatus for directing a light impulse of given intensity and duration on a photoelectric cell comprising a lamp for directing light on said photoelectric cell, a pair of wires adapted to be connected to a direct current power source, one of said wires being connected to said lamp, an adjustable potentiometer connected across said wires, an adjustable contact arm for said potentiometer, a connection between said contact arm and said lamp, normally open contacts in said connection, a switch connected across said wires, and means in series with said switch to close said normally open contacts.

12. Apparatus for directing a light impulse of given intensity and duration on a photoelectric cell comprising a lamp for directing light on said photoelectric cell, a pair of wires adapted to be connected to a direct current power source, one of said wires being connected to said lamp, an adjustable potentiometer connected across said wires, an adjustable contact arm for said potentiometer, a connection between said contact arm and said lamp, a relay coil connected across said wires, normally open contacts in said connection operable by said relay coil, a switch in series with said relay coil, normally closed contacts in series with said relay coil, and a timing relay coil in series with said switch for operating said normally closed contacts.

13. The method of testing a pin hole detector having a photoelectric cell for receiving an impulse when a pin hole occurs in a sheet being inspected, which method comprises connecting a second photoelectric cell in parallel with the photoelectric cell of the detector, directing a light of known intensity and duration on said second photoelectric cell, and varying the intensity of said light according to the size of hole it is desired to detect.

14. The method of testing a pin hole detector having a photoelectric cell for receiving an impulse when a pin hole occurs in a sheet being inspected, which method comprises connecting a second photoelectric cell in parallel with the photoelectric cell of the detector, directing a light of known intensity and duration on said second photoelectric cell, and varying the duration of said light according to the desired speed of the sheet past the first photoelectric cell.

15. The method of testing a pin hole detector having a photoelectric cell for receiving an impulse when a pin hole occurs in a sheet being inspected, which method comprises connecting a second photoelectric cell in parallel with the photoelectric cell of the detector, directing a light of known intensity and duration on said second photoelectric cell, varying the intensity of said light according to the size of hole it is desired to detect, and varying the duration of said light according to the desired speed of the sheet past the first photoelectric cell.

GEORGE H. RENDEL.

REFERENCES CITED

The following references are of record in the file of this patent:

UNITED STATES PATENTS

| Number | Name | Date |
| --- | --- | --- |
| 1,970,103 | Runaldue | Aug. 14, 1934 |
| 1,988,274 | Glaser | Jan. 15, 1935 |
| 2,404,147 | Strickland | July 16, 1946 |